S. B. MORSS.
AIR DISTRIBUTER FOR LAMPS AND STOVES.
APPLICATION FILED FEB. 20, 1913.

1,064,521. Patented June 10, 1913.

Witnesses:
C. W. Benjamin
Marie J. Nauright

Inventor
S. B. Morss.
by his Atty
T. F. Bourn

COLUMBIA PLANOGRAPH CO., WASHINGTON, D. C.

UNITED STATES PATENT OFFICE.

STEPHEN B. MORSS, OF RAHWAY, NEW JERSEY.

AIR-DISTRIBUTER FOR LAMPS AND STOVES.

1,064,521.

Specification of Letters Patent.   Patented June 10, 1913.

Application filed February 20, 1913.   Serial No. 749,589.

*To all whom it may concern:*

Be it known that I, STEPHEN B. MORSS, a citizen of the United States, and resident of Rahway, in the county of Union and State of New Jersey, have invented certain new and useful Improvements in Air-Distributers for Lamps and Stoves, of which the following is a specification.

My invention relates to improvements in perforated air distributers or thimbles for central draft lamps and stoves, and has for its object to advantageously heat and distribute air to the flame whereby the brilliancy of the flame is increased, serving to make the flame more steady and even at the top, reducing the danger of smoking and flickering, reducing downward thrust of heat from the flame, and generally to improve combustion of the oil and gases rising from the wick to the flame.

In carrying out my invention I provide a perforated air distributer or thimble adapted for a central draft oil lamp or stove having internal chambers increasing upwardly in dimensions, whereby heated air in increasing volume from the lower to the upper part of the distributer will be directed to and within the area of the flame, causing whitening, enlarging and spreading of the flame above the wick, thereby increasing the brilliancy and candle power of the flame.

My invention further comprises novel details of improvement and combinations of parts that will be more fully hereinafter set forth and then pointed out in the claims.

Figure 1:
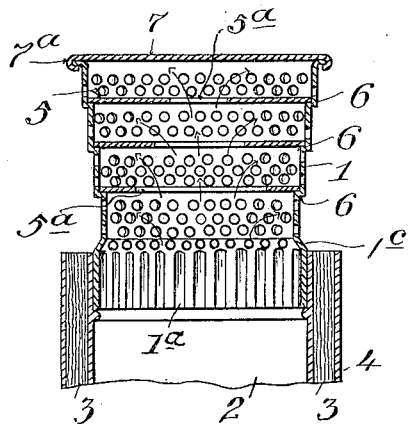
Figure 3:
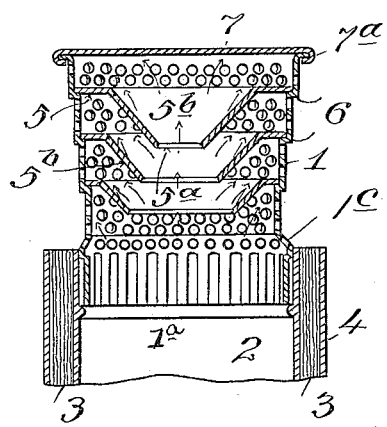
Figure 2:
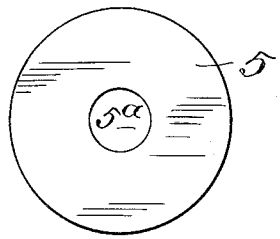
Figure 4:
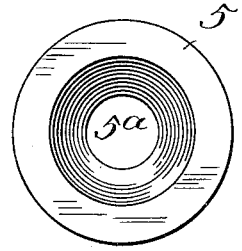
Figure 5:
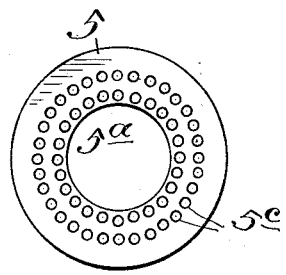

Reference is to be had to the accompanying drawings forming part hereof, wherein, Figure 1 is a vertical section of a portion of a central draft lamp burner equipped with my improved air distributer or thimble; Fig. 2 is a plan view of one of the air deflectors to be fitted within the distributers; Fig. 3 is a view similar to Fig. 1 illustrating a modification; Fig. 4 is a plan view of one of the air deflectors of Fig. 3, and Fig. 5 is a plan view of a modified deflector plate.

The numeral 1 indicates a perforated distributer or thimble, adapted to fit at its lower tubular portion 1ª, in any usual manner, within the inner central draft tube 2, of any well known central draft lamp or stove, wick 3 located between the tubes 2 and 4 being adapted to supply oil from a lamp or stove font in any well known manner. The perforated distributer or thimble 1, at its portion that projects above the wick tubes, increases in diameter upwardly, and is provided interiorly with a plurality of air distributing or deflector walls or plates 5, having substantially centrally disposed openings 5ª, one above another, providing chambers within the distributer or thimble increasing in area from the bottom upwardly, said chambers being shown of increasing transverse diameters from the bottom upwardly, the openings 5ª of the deflectors 5 shown decreasing in area from the bottom upwardly. In the particular construction of distributer illustrated in the accompanying drawings the walls of the distributer are offset, providing ledges at 6, upon which the deflector plates 5 rest, which ledges 6 are of increasing diameter in an upward direction along the distributer, providing circular air deflectors on the exterior of the distributer above the perforations of the latter therebelow.

In Figs. 1 and 2 the deflectors 5 are shown in the form of flat plates suitably spaced apart in an upward direction, whereby air from tube 2 is directed by such deflectors through the perforations in the distributer 1 next below the corresponding deflector, air passing through the opening 5ª in each deflector.

In Figs. 3 and 4 the deflectors 5 are shown partly flat and partly cone-like at 5ᵇ, the openings 5ª at the lower ends of the cone-like portions of the deflectors being of gradually decreasing area in an upward direction, causing the air to traverse the chambers between adjacent deflectors and through the perforations in the distributer 1 next below such deflectors.

Fig. 5 illustrates that the deflectors 5 may be provided with perforations 5ᶜ if desired, surrounding the central openings 5ª, giving increased freedom for the flow of air from chamber to chamber and heating same within the distributer.

The air entering the distributer 1 from the central draft tube 2 of the lamp is enabled to expand as it becomes heated and rises, owing to the shape and construction of the distributer, and the air is directed, step by step, in various streams into relatively shallow chambers or channels between the deflector plates 5, causing the air to have a rapid movement, the heated air passing through the various perforations in the distributer above the top of the wick and to the flame, improving the combustion and producing a corresponding brilliancy of the flame. Each deflector 5 obstructs a portion of the column of air rising from tube 2, directing a portion thereof through the perforations in the distributer below such deflector and permitting other portions of the air to flow through the openings 5ª of the higher deflectors, which air entering the chamber thereabove expands, as it is heated, a portion of which air is directed through the corresponding perforations of such chamber, and so on in an upward direction until all the air is caused to flow through the perforations in the distributer by reason of the closed top or cover plate 7 of the distributer, which is shown extending outwardly, in the form of a flange or ledge, at 7ª beyond the upper row of perforations in the distributer. Each of the ledges 6 and 7ª being above a stream of heated air, causes the same to be deflected toward or over the flame. As soon as the column of air enters the distributer it is broken up into various streams of air flowing to the perforations of the distributer, said perforations causing the breaking up and delivery of the heated air in minute jets to the flame, providing steadiness in the action of the latter, and preventing back flashing of the flame through the distributer. The ledges 6 are relatively narrow and permit the upward flow of air from the distributer perforations without causing the heat of the flame to be directed downwardly upon the oil font, thereby overcoming dangerous heating of the latter with consequent radiation of heat down and about the lamp.

My improved distributer, having the interior deflectors, permits the heat of the flame at the top of the wick to escape directly up to and out of the top of the lamp chimney, preventing undue heating of the oil font, and consequent excessive radiation from the flame to the immediate neighborhood of the lamp. Furthermore, the deflector plates, by supplying, step by step, heated air in increased volume from the lower to the upper part of the distributer, cause whitening, enlargement and spreading of the flame at the top of the wick, thereby increasing the candle power and brilliancy of the flame, also preventing the creeping of the flame and reducing danger of smoking and overcoming the liability of the flame flickering, evening the flame at the top, and reducing thereby tailings on the flame due to the unevenness of the surface of the wick.

The distributer illustrated is shown contracted or reduced at 1ᶜ, just above the top of wick tube 2, and provided with perforations, affording thereby a space between the wick, the flame and the lower portion of the distributer just above tube 2, which space affords a chamber for gases rising from the inner portion of the upturned wick above the wick tubes, which gases mingling with the air flowing through the perforations of the distributer aid in supporting and improving combustion.

Having now described my invention what I claim is:—

1. An air distributer for lamps and stoves provided with an exterior perforated wall and having a plurality of air deflectors located within said wall one above the other, said deflectors having openings decreasing in relative size one above the other.

2. An air distributer for lamps and stoves having a plurality of internal air deflectors, said deflectors having openings, and perforations surrounding said openings.

3. An air distributer for lamps and stoves having a plurality of internal air deflectors located one above the other, said deflectors having openings decreasing in relative size one above the other and having perforations surrounding said openings.

4. An air distributer for lamps and stoves having a plurality of spaced deflectors therein of gradually increasing diameter in an upward direction.

5. An air distributer for lamps and stoves having a plurality of spaced deflectors therein, said distributer having ledges upon which said deflectors rest.

6. An air distributer for lamps and stoves having a plurality of spaced deflectors therein of gradually increasing diameter in an upward direction, said distributer having ledges upon which said deflectors rest, said ledges being of increasing diameters in an upward direction.

7. An air distributer for lamps and stoves having internal transversely disposed deflectors, said distributer and deflectors increasing in diameter in an upward direction, said deflectors being provided with openings for the passage of air.

8. An air distributer for lamps and stoves having internal transversely disposed deflectors, said distributer and deflectors increasing in diameter in an upward direction, said deflectors being provided with openings for the passage of air, said openings decreasing in diameter in an upward direction.

9. An air distributer for lamps and stoves having ledges spaced apart in an upward direction, and deflectors resting upon said ledges, said deflectors having openings for the passage of air.

10. An air distributer for lamps and stoves having ledges spaced apart in an upward direction, and deflectors resting upon said ledges, within the distributer, said deflectors having openings for the passage of air, and perforations surrounding said openings within said distributer.

Signed at New York city, in the county of New York, and State of New York, this 19th day of February, A. D. 1913.

STEPHEN B. MORSS.

Witnesses:
MARIE T. WAINRIGHT,
T. F. BOURNE.